US005883352A

United States Patent [19]

Wolf et al.

[11] Patent Number: 5,883,352

[45] **Date of Patent: *Mar. 16, 1999**

[54] WELDING PROCESS

[75] Inventors: Heinrich Wolf, Hailer; Dieter Feldmer, Nidderau; Rudolf Schnabl, Hammersbach, all of Germany

[73] Assignee: W.C. Heraeus GmbH, Hanau, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 593,930

[22] Filed: Jan. 30, 1996

[30] Foreign Application Priority Data

Feb. 9, 1995 [DE] Germany ........................ 195 04 144.5

[51] Int. Cl.[6] ..................................................... B23K 11/18

[52] U.S. Cl. ..................................... 219/56.22; 219/117.1

[58] Field of Search ..................................... 428/929, 670, 428/672, 673, 674, 675; 200/267, 268, 269, 278; 219/56.22, 117.1

[56] References Cited

U.S. PATENT DOCUMENTS

| | | | |
|---|---|---|---|
| 1,155,427 | 10/1915 | Liebmann et al. | 428/929 |
| 2,181,083 | 11/1939 | Payette | 200/267 |
| 2,281,446 | 4/1942 | Laise | 200/268 |
| 2,688,574 | 9/1954 | Reed et al. | 428/929 |
| 3,191,275 | 6/1965 | Gwyn | 200/267 |
| 3,346,350 | 10/1967 | Spooner | 428/929 |
| 3,586,808 | 6/1971 | Shibata et al. | 200/267 |
| 4,331,286 | 5/1982 | Miyazaki et al. | 228/198 |
| 4,342,893 | 8/1982 | Wolf | 200/268 |
| 5,421,084 | 6/1995 | Wolf et al. | 29/885 |

FOREIGN PATENT DOCUMENTS

| | | |
|---|---|---|
| 132596 | 2/1985 | European Pat. Off. . |
| 0300197 | 1/1989 | European Pat. Off. . |
| 0301218 | 2/1989 | European Pat. Off. . |
| 0570662 | 11/1993 | European Pat. Off. . |
| 1-151114 | 6/1989 | Japan . |

OTHER PUBLICATIONS

Kammerer GmbH, "El. Energietechnik" H. 21, Mar. 1981, p. 19.

A. Keil et al., "Elektrische Kontakte und, ihre Werkstoffe", Springer–Verlaug 1984, pp. 215–235, 245–248.

Weik et al., "Anwendungvon Mikroprofilen für Elektrische Kontakte", Elektro–Anzeiger, vol. 38, No. 10 (1985).

Handy & Handy, brochure entitled "Clad Precious Metals", pp. 1–16, Jun. 1992.

*Primary Examiner*—Clifford C. Shaw

*Attorney, Agent, or Firm*—Whitman Breed Abbott & Morgan

[57] ABSTRACT

Intermediate material in the form of a metal strip with a contact area is provided with a projection on the bottom surface of its core area, i.e., on the surface to be joined to a contact carrier strip of copper or a copper alloy. The bottom surface of the strip facing the contact carrier strip is plated with a material which consists essentially of silver, and the melting point of the core area of the metal strip is above the melting point of silver. For the production of a semifinished product for electrical contacts, the metal strip is welded by its silver-coated bottom surface to the contact carrier strip, consisting essentially of copper. The silver from the coating on the core area of the metal strip and the copper from the contact carrier strip mix with each other and thus form an alloy which corresponds or is very close to the eutectic alloy with 28 wt. % of copper and the remainder of silver.

14 Claims, 1 Drawing Sheet

1
1'
2
3
4
4'
5
6
8
9
10
11
12
13
14
16
17

WELDING PROCESS

BACKGROUND OF THE INVENTION

The invention pertains to intermediate material for the production of electrical contacts by the bonding of this material by resistance heating to an electrically conductive contact carrier strip consisting essentially of copper. The intermediate material is in the form of a metal strip with a contact area. The bottom surface of this strip, i.e., the surface which can be bonded to the contact carrier strip, is coated with a material which consists essentially of silver, the melting point of the coating material being below the melting point of the metal strip. The invention also pertains to a process for the production of the intermediate material and to semifinished products for electrical contacts.

U.S. Pat. No. 5,421,084 discloses an intermediate material for the production of electrical contacts, especially relay contacts. This intermediate material is also designed as a metal strip with a contact area, and it is welded by resistance heating to an electrically conductive contact carrier, which also has an electrical conductivity of more than 15 m/(ohms×mm$^2$), i.e., more than (15 S×10$^6$)/m. The contact carrier consists essentially of copper. The surface of the metal strip opposite from the contact area has ridge-like projections to serve as welding bosses, which carry a coating consisting essentially of silver for welding to the carrier. The melting point of this coating material is below the melting point of the metal strip, which consists essentially of nickel. The contact area itself is based on a gold alloy or a silver-palladium alloy.

As part of the trend toward the miniaturization of components and their associated contacts, it has been found difficult to provide several rows of parallel projections.

SUMMARY OF THE INVENTION

The invention has the task of providing intermediate material for the production of electric contacts, this material being in the form of a metal strip with a quite narrow contact profile, the strip being suitable for resistance welding to a contact carrier strip with a high electric conductivity of more than 15 m/(ohms×mm$^2$), such as that present in the case of copper.

Another task of the invention is to provide a process for the production of the metal strip as intermediate material.

In addition, a process for the production of a semifinished product for electrical contacts is to be provided, in which the metal strip, as intermediate material, is bonded to a contact carrier strip of high conductivity.

In a preferred embodiment, the core area of the metal strip consists essentially of nickel, but it is also possible to provide a core area consisting of a copper-nickel alloy.

It has proven advantageous to use the relatively simple process of roll bonding to coat the projections.

The contact area for the later working contact consists preferably of a gold alloy or of a silver-palladium alloy. It is advantageous to apply this alloy by roll bonding at the same time that the projections are coated.

With respect to the process for the production of a semifinished product for electrical contacts, the task is accomplished by placing the plated ridge of the intermediate product against the support strip and welding it thereto by resistance heating.

An individual, ridge-like projection has been found especially advantageous because of the energy savings obtained in the welding process. That is, the amount of welding current required to weld a single projection is less than that required to weld several projections, and the service life of the associated electrodes is longer as well.

DETAILED DESCRIPTION OF THE PREFERRED EMBODIMENT

Figures 1A, 1B, 1C, 2A, 2B, 2C:
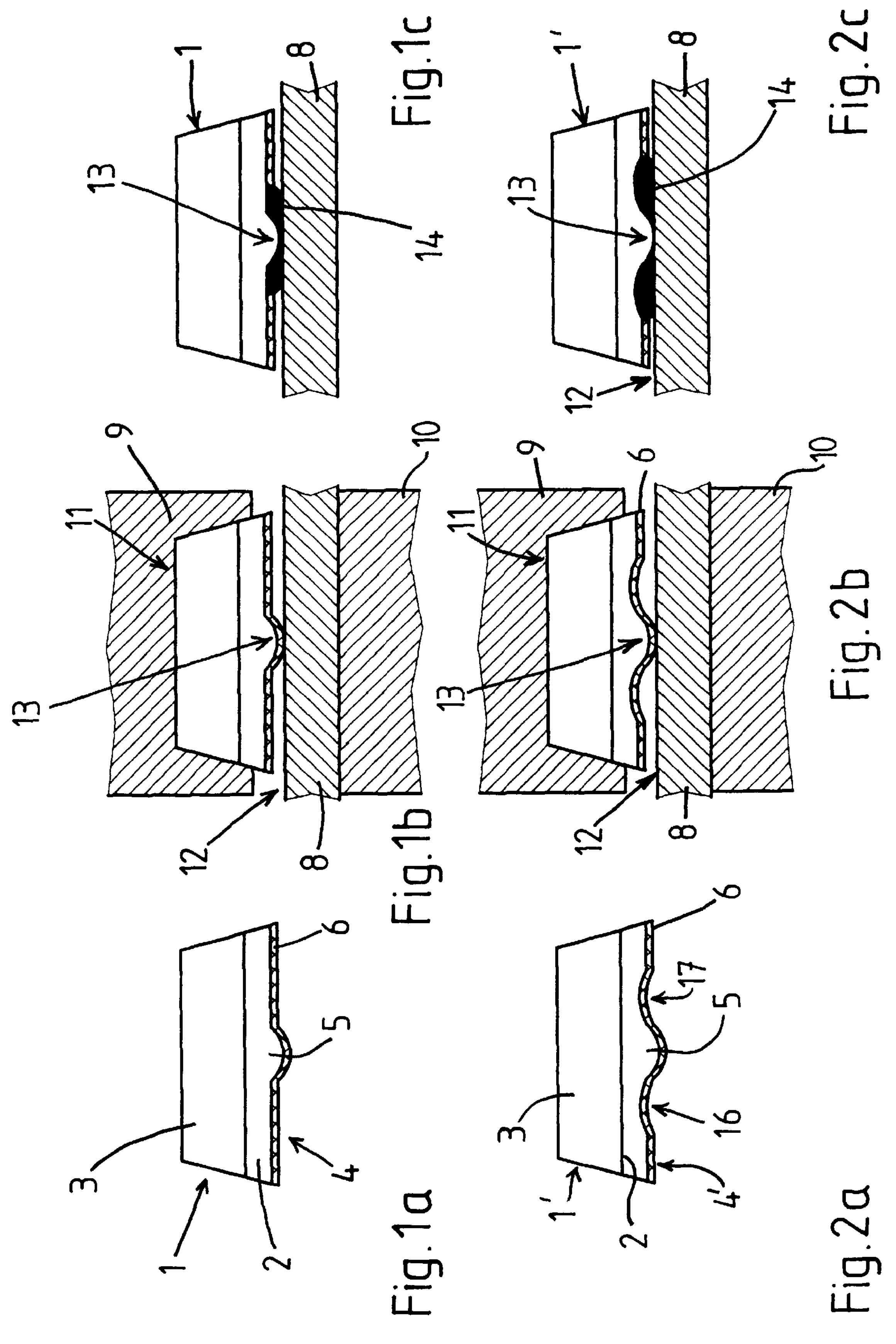
FIG. 1*a* shows a cross section of the metal strip serving as intermediate material, which has been provided with a contact area.
FIG. 1*b* shows a cross section of the intermediate material in question in the electrode device; the contact carrier strip can also be seen in cross section. For the sake of clarity, only part of the electrode device is shown.
FIG. 1*c* shows the contact profile ridge after it has been bonded to the contact carrier to form the semifinished product for electrical contacts.
FIG. 2*a* shows a cross section of a metal strip provided with a contact area, the strip having been provided on the side facing the contact carrier with a silver coating.
FIG. 2*b* shows the metal strip clamped in the electrode device; the contact carrier strip can also be seen next to the lower electrode.
FIG. 2*c* shows the contact profile ridge of the semifinished product after the metal strip has been bonded to the metal carrier.

FIG. 1*a* shows the intermediate material in the form of a metal strip 1. The carrier which facilitates welding, i.e., core area 2, consists essentially of nickel or a copper-nickel-based alloy; it is preferable to use an alloy which contains 30 wt. % of nickel, about 1 wt. % of iron, and a remainder of copper. In another preferred embodiment, core area 2 of the metal strip consists of an alloy which contains 9 wt. % of nickel, 2 wt. % of tin, and a remainder of copper. The actual contact area 3 for the later working contact is situated on top of core area 2; this area consists essentially of noble metal, preferably a gold alloy or a silver-palladium alloy. At the center of bottom surface 4 of core area 2 there is a projection 5, which serves as a welding boss; the entire bottom surface 4 of the strip is provided with a coating consisting essentially of silver.

The production of a metal strip such as this is known from U.S. Pat. No. 5,421,084.

Both core area 2 and contact area 3 of metal strip 1 have a trapezoidal outline when seen in cross section. The width of the profile increases continuously in the direction of projection 5.

FIG. 1*b* shows metal strip 1 after it has been set down on contact carrier strip 8 in the electrode device; coating 6 on ridge-like projection 5 rests directly on the surface of contact carrier strip 8. The welding current circuit is closed by electrodes 9, 10, only parts of which are shown. Electrode 9 has a recess 11 with a trapezoidal cross section, in which the metal strip can be held by its top surface in a positively locking manner. As a result, projection 5 of metal strip 1 rests with exactly the right orientation on surface 12 of contact carrier strip 8. The welding current circuit is not shown here for the sake of clarity. On the basis of FIG. 1*b*, it can be seen that the current density in the welding current circuit increases as it flows from metal strip 1 in the area of projection 5 toward contact carrier 8, as a result of which there is also an increase in the heat generated in the area of projection 5 as it becomes narrower in cross section, especially in the area near the adjacent contact carrier. Thus an increasing amount of heat is generated in the area of the projection, which means that coating 6 can be melted in the initial phase of a welding current pulse, whereupon the material of the coating is then forced by the pressure of electrodes 9, 10 onto contact carrier 8. A large melt pool extending to the edge of metal strip 1 is thus formed, which, after solidification, offers optimum conductivity for the contact current. That is, coating 6 is brought to the melting point during the initial phase of the welding current pulse, and the coating material is thus able to form an alloy with the material of the contact carrier, which consists essentially of copper. The alloy consists essentially of silver and copper. Not only copper but also copper alloys such as bronze, German silver (45–70% Cu, 8–28% Ni, 8–45% Zn), copper-iron alloys, and copper-beryllium alloys are also suitable as materials for the contact carrier strip.

FIG. 1*c* shows a cross section of a contact ridge after it has been removed from the electrode device shown partially in FIG. 1*b*. In this state, the contact ridge is bonded electrically to contact carrier strip 8 underneath it and is joined to it in a mechanically rigid manner. It can be easily seen from FIG. 1*c* that coating 6, which started out on bottom surface 4 of the metal strip, has been melted by resistance heating, has run down from projection 5 and the adjacent areas of bottom surface 4, and has bonded to the copper on surface 12 of contact carrier 8, thus joining contact carrier strip 8 to metal strip 1. During the actual welding process, the point of contact, designated 13 in FIG. 1*b*, indicating the area to be joined, is heated to such a temperature by the action of the electric current that the silver of coating 6 and the copper at the surface of contact carrier 8 form an alloy with each other. Through the proper adjustment of the welding parameters, a new alloy 14 is formed, which corresponds or is very close to the eutectic, i.e., an alloy with 28 wt. % of copper and a remainder of silver (AgCu28) with a melting point of 779° C. When the alloy thus formed is in the molten state, it may, depending on the length of the welding interval, spread out over the entire width of bottom surface 4 of metal strip 1.

FIG. 2*a* shows a metal strip 1' as intermediate material, which has essentially the same structure as that described on the basis of FIG. 1*a*; in contrast to FIG. 1*a*, however, bottom surface 4*a* of the strip has two valley-like grooves or depressions 16, 17, between which a ridge-like projection 5 familiar from FIG. 1*a* is found. Depressions 16, 17 are designed geometrically in such a way that they are filled by the volume of melt pool 14 when the strip is welded onto contact carrier strip 8. This prevents the alloy which has formed from escaping laterally. Preferably nickel or a copper-nickel-based alloy is again used as the material for core area 2, i.e., for the carrier which facilitates the welding process.

FIG. 2*b* illustrates the mounting of metal strip 1' in the electrode device. In the area of projection 5, coating 6 of metal strip 1', rests directly on surface 12 of contact carrier strip 8. The two electrodes 9, 10 are shown only partially. For the sake of clarity, the electrode device has been omitted. FIG. 2*b* also shows trapezoidal recess 11 in electrode 9, into which metal strip 1' can be held in positive fashion. FIG. 2*c* shows a cross section of a contact ridge, after it has been removed from the electrode device shown in FIG. 2*b*, where it has been connected electrically and bonded mechanically in a rigid manner by welding to contact carrier strip 8. During the welding operation, the electric current heats up area 13, i.e., the area where projection 5 with silver coating 6 touches contact carrier 8. The heat is sufficient to liquefy first the silver which coats the projection and then the silver in valley-like depressions 16, 17. Heating is continued until the silver from the coating and the copper of contact carrier strip 8 mix with each other and therefore form an alloy which corresponds or is very close to the eutectic with 28 wt. % of copper and the remainder of silver with a melting point of 779° C.

The contact carrier strip consists preferably of copper, but it is also possible to use copper alloys such as bronze, German silver, $CuFe_2$, or CuBe as materials for the contact carrier strip.

What is claimed is:

1. A method for manufacturing an electrical contact, said method comprising (1) providing a contact support strip with a generally flat surface portion being of copper or copper alloy;

(2) providing a contact strip having a bonding surface, said bonding surface having a ridge protruding therefrom and a plating material of silver or silver alloy on said bonding surface including said ridge;

(3) contacting said contact strip and said contact support strip so that said bonding surface of said contact strip engages the flat surface portion of the contact strip, contact occurring between the strips only between the plating material on the ridge and the flat surface portion of the contact support strip; and (4) applying electrical current through the contact strip and the contact support strip so that the electrical current flows through the plating material and causes the plating material to form with the copper or copper alloy of the support strip a silver/copper base alloy with a melting point which substantially corresponds to the eutectic point of silver and copper.

2. The process of claim 1, wherein said bonding surface is part of a core in said contact strip, said core being formed of a material selected from the group consisting of nickel and nickel alloy.

3. The process of claim 2, said core being formed of a copper nickel base alloy.

4. The process of claim 3, said alloy containing 9 to 70% copper.

5. The process of claim 4, wherein said plating material consists essentially of silver.

6. The process of claim 3, said alloy containing 2 to 10% tin.

7. The process of claim 6, wherein said plating material consists essentially of silver.

8. The process of claim 3, wherein said plating material consists essentially of silver.

9. The process of claim 2, wherein said plating material consists essentially of silver.

10. The process of claim 1, wherein said bonding surface of said contact strip has valleys on each side of said ridge, said ridge protruding to a crest at a height above said valleys, said plating material on said crest having a thickness of about 10% to 50% of said height.

11. The process of claim 10, wherein said plating material consists essentially of silver.

12. The process of claim 1, wherein said bonding surface of said contact strip has valleys on each side of said ridge, said plating material filling said valleys.

13. The process of claim 12, wherein said plating material consists essentially of silver.

14. The process of claim 1, wherein said plating material consists essentially of silver.

* * * * *